(12) United States Patent
Martin

(10) Patent No.: US 7,822,776 B2
(45) Date of Patent: Oct. 26, 2010

(54) MULTIDIMENSIONAL DYNAMIC CLUSTERING (MDDC)

(76) Inventor: Michael Wayne Martin, 107 Huntsmoor La., Cary, NC (US) 27513-4732

( * ) Notice: Subject to any disclaimer, the term of this patent is extended or adjusted under 35 U.S.C. 154(b) by 1230 days.

(21) Appl. No.: 11/324,558

(22) Filed: Dec. 31, 2005

(65) Prior Publication Data

US 2007/0156634 A1    Jul. 5, 2007

(51) Int. Cl.
*G06F 7/00* (2006.01)
(52) U.S. Cl. ...................... 707/796; 707/803
(58) Field of Classification Search ............. 707/796, 707/803
See application file for complete search history.

(56) References Cited

U.S. PATENT DOCUMENTS

| | | | |
|---|---|---|---|
| 5,359,724 A | 10/1994 | Earle | |
| 5,864,857 A | 1/1999 | Ohata et al. | |
| 5,940,818 A | 8/1999 | Malloy et al. | |
| 5,943,668 A | 8/1999 | Malloy et al. | |
| 6,003,036 A | 12/1999 | Martin | |
| 6,134,541 A | 10/2000 | Castelli et al. | |
| 6,182,060 B1 | 1/2001 | Hedgcock et al. | |
| 6,460,026 B1 | 10/2002 | Pasumansky | |
| 2003/0004938 A1* | 1/2003 | Lawder | 707/3 |

* cited by examiner

*Primary Examiner*—Hung T Vy
*Assistant Examiner*—Michael Le

(57) ABSTRACT

This document discloses a software method, data structure, apparatus, and article of manufacture that dynamically and symmetrically clusters multidimensional data onto linear storage mediums. The disclosed embodiments provide methods to store, maintain, and retrieve multidimensional space based on dimensions and possibly dimension groups of two or more dimensions. These methods dynamically access, add, update, or remove dimension key values from any dimension or any group of dimensions while simultaneously enforcing the symmetry from all combinations of all dimensions and dimension groups. Further, this document discloses data structures herein that map the multidimensional data to one-dimensional storage mediums.

18 Claims, 5 Drawing Sheets

| Group 1 | Group 1 | | |
|---|---|---|---|
| Dimension 1 | Dimension 2 | Dimension 3 | Dimension 4 |
| 1101101 | 1010011 | 10011 | 0011 |

| Variable Length Key |
|---|
| 1011010101000000011 |

FIG. 1

| Byte 1 | Byte 2 | Byte 3 |
|---|---|---|
| 11011010 | 10100000 | 00011000 |

FIG. 2

| Group 1 | Group 1 | | |
|---|---|---|---|
| Dimension 1 | Dimension 2 | Dimension 3 | Dimension 4 |
| 1101101 | 1010011 | 10011 | 0011 |

FIG. 3

| Cycle 1 | Cycle 2 | Cycle 3 | Cycle 4 | Cycle 5 | Cycle 6 | Cycle 7 |
|---|---|---|---|---|---|---|
| 110 | 100 | 001 | 111 | 11 | 0 | 1 |
| Cycle 8 | Cycle 9 | Cycle 10 | Cycle 11 | Cycle 12 | Cycle 13 | Cycle 14 |
| 1 | 0 | 1 | 0 | 0 | 1 | 1 |

MULTIDIMENSIONAL DYNAMIC CLUSTERING (MDDC)

BACKGROUND OF THE INVENTION

1. Technical Field

The present invention relates to OLAP (On-Line Analytical Processing) and data warehouse applications. Specifically, it relates to data structures that map multidimensional data onto linear storage mediums.

2. Description of Prior Art

Data Warehouse and OLAP applications, have highlighted the need for fast and efficient methods to dynamically and symmetrically store, maintain, and retrieve multidimensional data. Ultimately, such methods would simultaneously provide real-time update and query capabilities from any combination of participating dimensions or dimension groups. To date, other multidimensional storage and retrieval methods have not been able to provide an algorithm and data structure that simultaneously delivers dynamic maintenance capabilities, efficient storage and operation, and symmetric clustering from any combination of participating dimensions or groups of dimensions.

Hypercubes are the classic commercial approach. Hypercubes store each possible combination of values of all participating dimensions in their data structures. This approach is very inefficient in space usage, I/O (Input/Output) operations, and computer processing cycles. Hypercubes are also not symmetric. The position or column number of a dimension in a Hypercube along with dimension cardinalities determine the dimension's degree of clustering in the data. A dimension with position 0 in a Hypercube with a high cardinality might dominate all clustering in the data while a dimension with position N−1 where N is the number of dimensions in the Hypercube and a low cardinality might not participate in the clustering of the data at all. Compression assists Hypercubes with storage efficiency but further skews symmetry amongst dimensions. Finally, Hypercubes are not dynamic. The Hypercube data structure allocates a predetermined number of cells and requires full reorganization to alter this predetermined number of cells.

Conventional grid or tree approaches with multidimensional clustering such as grid files, hB-trees, MDB trees, R-trees, and the like have some success in symmetrically clustering data but fail to dynamically and effectively maintain symmetry and are not efficient in terms of computational complexity, I/O, computer processing cycles, memory, disk space, concurrency management, predictability, and recoverability.

More recently, relational database vendors have adopted bit mapped indexes. These data structures do not truly provide symmetry. They typically provide one bit mapped index for each participating dimension. These indexes are usually compressed and are very small in terms of disk storage space. Access is available from any combination of dimensions. But, the technique does nothing to cluster the underlying data. As a result, bit mapped indexes do not enforce symmetry. If dimension A determines the sort order or clustering of the multidimensional data and dimension A has a high enough cardinality so that all multidimensional elements associated with each key value of dimension A require no more than one complete database block, then despite all bit mapped indexes any dimension other than A will necessitate a full scan of every block in the multidimensional data.

Less dynamic data structures can more easily provide true symmetry. U.S. Pat. No. 6,003,036 details one such example. This technique uses interval partitioning to ensure that each dimension or dimension group of two or more dimensions participates equally in the partitioning process and successfully stores multidimensional data with one or more dimensions or dimension groups. It is also efficient in terms of complexity, computer processing time, I/O, recoverability, concurrency, and disk space. However, it does not allow unlimited updates to partitions without complete data reorganization when the data exceeds predetermined thresholds.

Z-ordering and other multidimensional mapping curves are relatively new and promising approaches to multidimensional data clustering. They involve interleaving of bits from dimension key values from predetermined ranges of numbers in order to provide symmetry for each participating dimension. In the form of Universal or UB-Trees, these techniques take advantage of already well established and proven B-trees or their derivatives are therefore very efficient. They fall short of true symmetry enforcement, however. With Z-ordering, symmetry depends on the number of bits in each dimension key value. If dimension A has 256 distinct members and is able to represent them all with 8 bits while dimension B has 100 distinct members but requires 16 bits to represent them all, then dimension A might dominate the clustering process and starve dimension B in its clustering thus compromising symmetry. Hilbert Orderings and Gray Coding are attempts to improve this technique for some multidimensional applications but still fall short of controlling symmetry in OLAP applications because they still must predetermine the number of bits for each participating dimension. Z-ordering and its derivatives are also not truly dynamic since they must set or predetermine upper ranges on each dimension. With Z-ordering, Hilbert Orderings, and Gray Coding a tradeoff exists between symmetry and the upper limit of each dimension or between dynamic operation and symmetry.

U.S. Pat. No. 6,460,026 uses the technique of multidimensional data ordering or prioritizing participating sets of dimensions hierarchically and uses these priorities in the overall ordering or clustering process. These dimension sets are the same as dimension groups or groups of keys in U.S. Pat. No. 6,003,036. The overall technique in U.S. Pat. No. 6,460,026 is more dynamic than the technique in U.S. Pat. No. 6,003,036 but does not enforce symmetry as well as the technique in U.S. Pat. No. 6,003,036. In addition, the technique in U.S. Pat. No. 6,460,026 is not fully dynamic.

In regard to symmetry, when the technique in U.S. Pat. No. 6,460,026 uses dimensional priorities for simple or multiple orderings, the first few dimensions in the orderings have the ability to completely dominate the clustering process depending on cardinality. In general, the clustering factor of each dimension participating in a non-symmetric ordering depends on its position or priority in the over all ordering. Despite the fact that this method also works with Z-ordering, Hilbert Orderings, and Gray Coding, none of these techniques completely correct potential symmetry flaws. For example, if multidimensional data ordering uses Z-ordering and defines a dimension group or hierarchy of dimensions G containing dimensions A, B, and C requiring a large number of bits for each dimension and another dimension H such that H clusters the data with a small number of bits, this technique is not likely to provide symmetric access to the multidimensional data. The technique in U.S. Pat. No. 6,460,026 is unable to enforce true symmetry but rather is susceptible to data content because of Z-ordering or other static bit interleaving techniques as mentioned previously and the various ordering priorities that U.S. Pat. No. 6,460,026 discloses. The technique in U.S. Pat. No. 6,460,026 also has symmetry problems relating to hierarchies or multiple levels in dimension groups. Multidimensional data ordering must designate a predetermined number of bits for all children of all parents in a hierarchy because of the rules of Z-ordering and the other static bit interleaving techniques. Different parents will typically have different numbers of children and will therefore need different numbers of bits. Extra, unnecessary bits have potential to adversely affect symmetry. These flaws or weaknesses in U.S. Pat. No. 6,460,026 are crucial since the primary rationale for multidimensional data structures is to provide symmetry amongst participating dimensions or dimension groups.

The technique in U.S. Pat. No. 6,460,026 is also not dynamic. When the technique employs Z-ordering, Hilbert Orderings, or Gray Coding, it must predetermine the number of bits for each dimension and each level within a dimension group. The predetermined number of bits for each level in a dimension group must be the maximum for all parents on the previous level in the entirety of the data. If the number of members or elements in the dimension increases beyond what the predetermined number of bits can represent, then the entire data structure requires reorganization before it can grow beyond the predetermined limits for each dimension or level within a dimension group. If the predetermined limit is set too high for some dimensions or levels within dimension groups, then the algorithm in U.S. Pat. No. 6,460,026 might not enforce symmetry effectively because of the unused bits or padding.

In summary U.S. Pat. No. 6,460,026 can not dynamically maintain symmetry. The invention contained herein efficiently maintains symmetry as well or better than U.S. Pat. No. 6,460,026 and without predetermined limits on dimensions that prevent dynamic operation. Unlike the multidimensional data ordering technique in U.S. Pat. No. 6,460,026, the invention disclosed herein does not require a tradeoff between dynamic operation and symmetry.

SUMMARY OF OBJECTS AND ADVANTAGES

Objects and advantages that follow do not limit the scope of the present invention in any way. The claims alone should determine the scope of the present invention.

As the below embodiments detail, the present invention provides an efficient and dynamic as well as symmetric mapping of multidimensional data unto linear storage mediums.

One object and advantage of MDDC allows OLAP applications to insert, delete, and update data from any dimension or any dimension within a dimension group while dynamically controlling symmetry without regard to native data content or degree of sparseness.

A second object and advantage of MDDC ensures that queries can take equal advantage of clustering regardless of which combinations of participating dimensions or dimension groups they constrain.

A third object and advantage of MDDC allows queries to take advantage of star-joins without generating all combinations of dimension values or without generating a Cartesian join of dimension values that the queries specify.

An additional object and advantage of MDDC allows it to precisely control the amount of packing on each data block from less than 50 percent to within one record of 100 percent full while referencing these data blocks with a non-dense index that only has one index entry per data block.

Another object and advantage of MDDC allows it to evenly distribute or stripe blocks or records of multidimensional data across multiple computer storage mediums or processing platforms such as multiple disk drives and multiple computer systems without compromising its dynamic and efficient symmetry enforcement.

Another object and advantage of MDDC allows dynamic and unlimited growth in dimension or dimension group keys while controlling the number of bits or length of dimension keys in multidimensional data structures to further increase dynamic symmetry.

Yet another object and advantage of MDDC is that it employs a data structure that maps the multidimensional data to a one dimensional linear data structure and corresponding storage medium without compromising its efficiency, dynamic operation, and symmetry enforcement.

BRIEF DESCRIPTION OF THE DRAWINGS

FIG. 1 illustrates a variable length LSB (least significant bit) to MSB (most significant bit) dimension key containing 19 bits. Note that it ends with a 1 bit as always except in the single case of the zero key.

FIG. 2 illustrates an efficient byte storage format for the variable length dimension key in FIG. 1.

FIG. 3 illustrates 1 dimension group containing 2 dimensions and 2 individual dimensions with variable length dimension keys in LSB to MSB order.

FIG. 4 illustrates variable length bit interleaving technique involving the bits from the 1 dimension group of 2 dimensions and 2 individual dimensions in FIG. 3. Note the selection of one bit from each dimension or dimension group on each cycle. Once the technique depletes all the bits for a given dimension it no longer includes the dimension in the bit selection cycle.

DETAILED DESCRIPTION OF THE INVENTION

Detailed descriptions, example embodiments, and drawing figures below do not limit the scope of the present invention in any way. The claims alone should determine the scope of the present invention.

Overview

MDDC uses uniform bit distribution with dynamic bit interleaving to efficiently and dynamically control symmetry.

First MDDC uses uniform bit distribution for all dimensions and dimension groups in conjunction with dynamic bit interleaving in lieu of Z-ordering, Hilbert Orderings, Gray Coding, or other bit interleaving techniques. FIG. 1 depicts a uniform bit distribution key using the LSB to MSB method. FIG. 2 demonstrates a simple but effective method to store variable length LSB to MSB keys. In FIG. 2 a variable length key occupies one or more bytes. All bytes except the last one in a dimension key have a 1 as the first bit. The last byte has a 0 as its first bit indicating no more bytes to follow. MDDC could also use the last bit in each byte in lieu of the first for this purpose. Since the LSB to MSB format places all trailing zeros up front, all keys end with a 1 bit except a key value of 0.

MDDC handles 0 with this technique by simply storing the 0 in a byte where all 8 bits are 0. This allows MDDC to determine the exact length of a variable length bit string even though the storage format in FIG. 2 might contain extra bits. With the storage method in FIG. 2, the LSB to MSB key is able to use 7 bits of each byte and the technique does not require any length fields. This technique is more effective than length fields for any variable length key or key component less than 8 bytes. Eight bytes covers the vast majority of all dimension key values. Should a majority of dimension key values contain more than 8 bytes, then MDDC could alternatively employ key length fields. MDDC assigns sequential integers for each dimension key value whether it is a standalone dimension or part of dimension group. MDDC does this in the dimensions themselves and not within multidimensional data structures. MDDC uses indexes to maintain the next key or list of unused key values in each dimension. When assigning keys in a dimension group, the index includes all parent level dimensions from the dimension group as well as the current dimension.

Figures 5, 6:
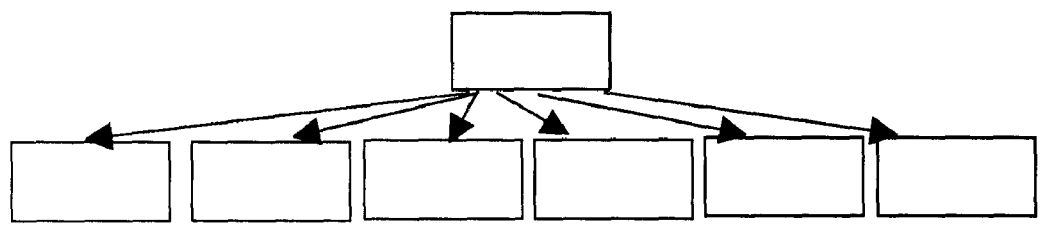
FIG. 5 illustrates the bit interleaving for the 1 dimension group of 2 dimensions and 2 individual dimensions from FIG. 4.
FIG. 6 illustrates a typical B-tree capable of housing blocks of MDDC data.

Next MDDC uses dynamic bit interleaving to integrate all participating dimensions. Uniform bit distribution attempts to minimize the number of bits that each dimension key requires to uniquely identify itself amongst other dimension keys from the same dimension or dimension group. Uniform bit distribution also attempts to evenly distribute all dimension keys across a set of minimum length bit dimension keys. Ideally, 5 bits would represent 32 dimension keys and 10 bits would represent 1024 dimension keys. Dynamic bit interleaving then interleaves or splices these bits to form one virtual key. For example, if a dimension only contains two unique keys, this method attempts to assign one key to bit value 0 and the other key to bit value 1. This method then is able to cluster or partition all the multidimensional data into two partitions with only 1 bit, one partition representing each dimension key and bit value. According to the convention of bit interleaving, MDDC alternates between bits from each dimension or dimension group to completely cluster or partition the multidimensional data. Ideally, each dimension divides the multidimensional data exactly in half with each bit. Consequently, under optimal circumstances, MDDC requires a minimum and equal number of bits from each dimension or dimension group to fully cluster or partition the multidimensional data. FIG. 4 and FIG. 5 depict the interleaving process and result. Note that MDDC need not store the data in interleaved format but preferably generates the interleaving dynamically as it compares keys. When MDDC compares keys in this dynamic way it also uses an imaginary bit to terminate variable length bit strings. Therefore if two dimension key values have different lengths and have the same bit values through the last bit of the shorter key, MDDC uses the imaginary bit to collate the shorter key before the longer key. The imaginary bit does not count against the shorter key in the dynamic bit interleaving process as depicted in the bit interleaving result in FIG. 5. MDDC can use all bits allocated for each dimension key or can limit itself to a predetermined number of bits for each dimension. This allows MDDC to dynamically maintain key values in dimensions while improving symmetry in multidimensional data structures. Finally, MDDC simply appends nonparticipating dimensions after the bits from the dynamic bit interleaving process. MDDC also appends bits beyond upper dimension limits in a similar manner.

Therefore in summary, MDDC uses uniform bit distribution and dynamical bit interleaving to dynamically and efficiently maintain symmetry amongst all combinations of dimensions and dimension groups.

Operation

In this embodiment, MDDC merely substitutes uniform bit distribution for dimensions and dimension groups in data structures such as but not limited to B-trees in FIG. 6 and then proceeds to utilize data structures with few other changes. These changes only affect key values and key comparison operations. Therefore, MDDC does not alter the structure or operation of host data structures in a significant manner.

For queries, MDDC either searches the data structure with full or partial multidimensional keys. For full multidimensional keys, MDDC searches for multidimensional keys in the data structure just as it would for one-dimension data structures. For partial multidimensional keys, MDDC replaces missing bits in the bit interleaving with all combinations of 0s and 1s as appropriate and in effect searches for all possible combinations of full multidimensional keys. MDDC is able to order these multiple key searches the same way as the order or the data structure thereby increasing efficiency by eliminating the need to search for some keys or at least eliminating the need for I/O operations for some keys. This is especially advantageous if dimension source tables maintain themselves in uniform bit distribution key order since no sorting is required prior to searching the multidimensional data. Finally, MDDC is able to efficiently search for multiple partial keys from several dimension groups and dimensions in the same way. MDDC is able to perform a star-join without a pre-computed Cartesian product of the dimensions and dimension groups. MDDC is therefore able to eliminate much of the expensive I/O and processing resources associated with a full Cartesian join on sparsely populated data structures. This is significant since it allows the database optimizer to always choose a star-join for MDDC data structures without performance penalties.

With the exceptions of how MDDC determines key values and how it does comparisons, MDDC inserts, updates, and deletes data in the usual way for host data structures. Inserts, deletes, and updates are almost identical to their single dimension counterparts. For inserts, it uses the full multidimensional key of the records that it will insert into the multidimensional data to find the correct position in the data structure and then updates the data structure to reflect the new insertions. For deletes, MDDC uses the query criteria to search for the deletion candidates and if it finds them updates the data structure to reflect the removals. Similarly for updates, MDDC uses the query criteria to find the update candidates, updates them, and updates the data structure to reflect the changes if necessary. A practitioner in the art will appreciate the fact that MDDC can use a non-dense index and therefore is able to better retain the higher level index portions of its data structure in the RAM and cache in computer medium hierarchies such as those in FIG. 7 and FIG. 8 during insert, delete, and update operations for better efficiency.

Example Embodiments

As the descriptions that follow illustrate, MDDC provides a more efficient, dynamic, and symmetric software method, data structure, apparatus, and article of manufacture for clustering multidimensional data. MDDC is a very flexible and robust technique. But these embodiments only present examples and do not in any way limit the scope of the present invention. The claims alone should be used to determine the scope of the present invention.

In general MDDC uses variable length bit strings. MDDC can assign new integer key values for each new dimension key sequentially. MDDC can use indexes for each dimension to determine the next sequential key for each dimension. Additionally, such indexes will work for dimensions within dimension groups. With this technique, MDDC can dynamically assign dimension keys within dimension groups in the context of parent keys to decrease the overall length of dimension key groups and improve symmetry. These indexes are only used for dimensions. MDDC does not require them for the much larger multidimensional data structures. MDDC reverses the significant order of dimension keys from MSB to LSB to keys in LSB to MSB and only uses the number of bits that it needs to uniquely identify each key. This results in improved symmetry and unlimited growth for each dimension. This technique also allows the dimension primary keys to be in the same order as the multidimensional data cluster with regard to each dimension and thereby increases query efficiency. Variable length LSB to MSB keys can also use key recycling or reuse as internal record identifiers in lieu of external primary keys to decrease average bit string lengths.

As the previous paragraph suggests, MDDC can use ordered search algorithms such as the "Tetris-Algorithm" or other sorted searches to improve the efficiency of queries. MDDC is capable to pre-sorting dimension key values and storing the primary keys for the dimensions in this optimal order so that MDDC can further improve query efficiency for the "Tetris-Algorithm" and other sorted search algorithms. MDDC can also use a variety of other search algorithms including but not limited to single point searches, star-joins without Cartesian products, and independent dimension searches that MDDC combines with dynamic bit maps. All these examples and combinations of examples represent distinct embodiments that work in combination with other embodiments.

One of the most important results of MDDC is that it clusters multidimensional data onto data blocks suitable for storage on linear storage mediums and standard data structures. B-trees as FIG. 6 depicts represent a preferred embodiment since B-trees are robust, efficient, predictable, and ubiquitous in database management systems. MDDC, however, can also use ISAM, binary trees, AVL trees, X-Trees as well as many other data structures. Depending on the underlying data structure, MDDC can preload data 100 percent packed or load data dynamically and allow the data structure to dictate packing as MDDC inserts records. In this case B-trees would ensure a minimum packing factor of 50 percent. All these examples and combinations of examples represent distinct embodiments that work in combination with other embodiments.

Figure 7:
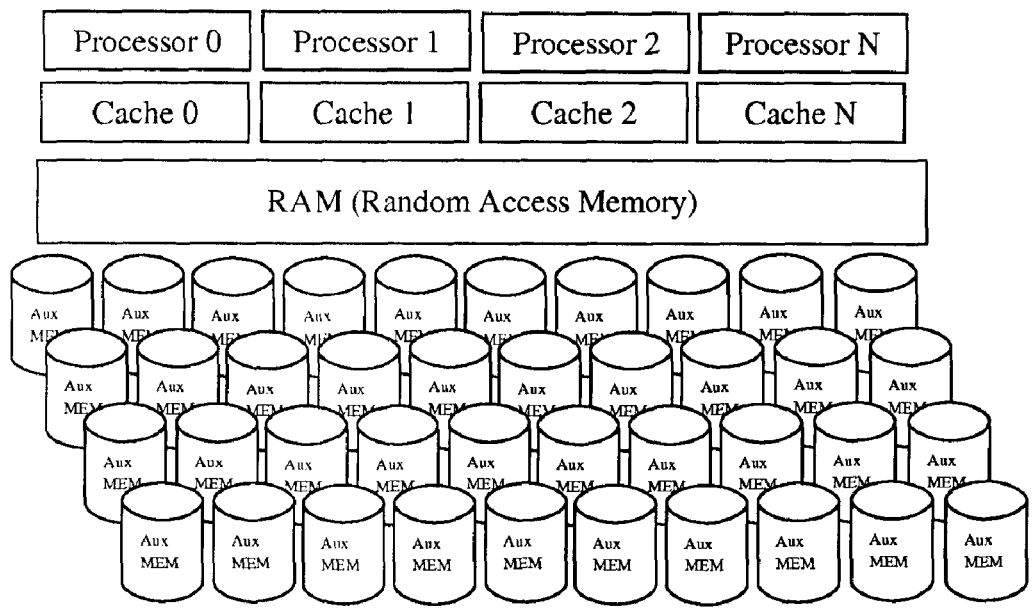
FIG. 7 illustrates a single computer with a hierarchy of storage mediums consisting of arrays of auxiliary memory, RAM, and processor caches capable of housing blocks of MDDC data.
Figure 8:
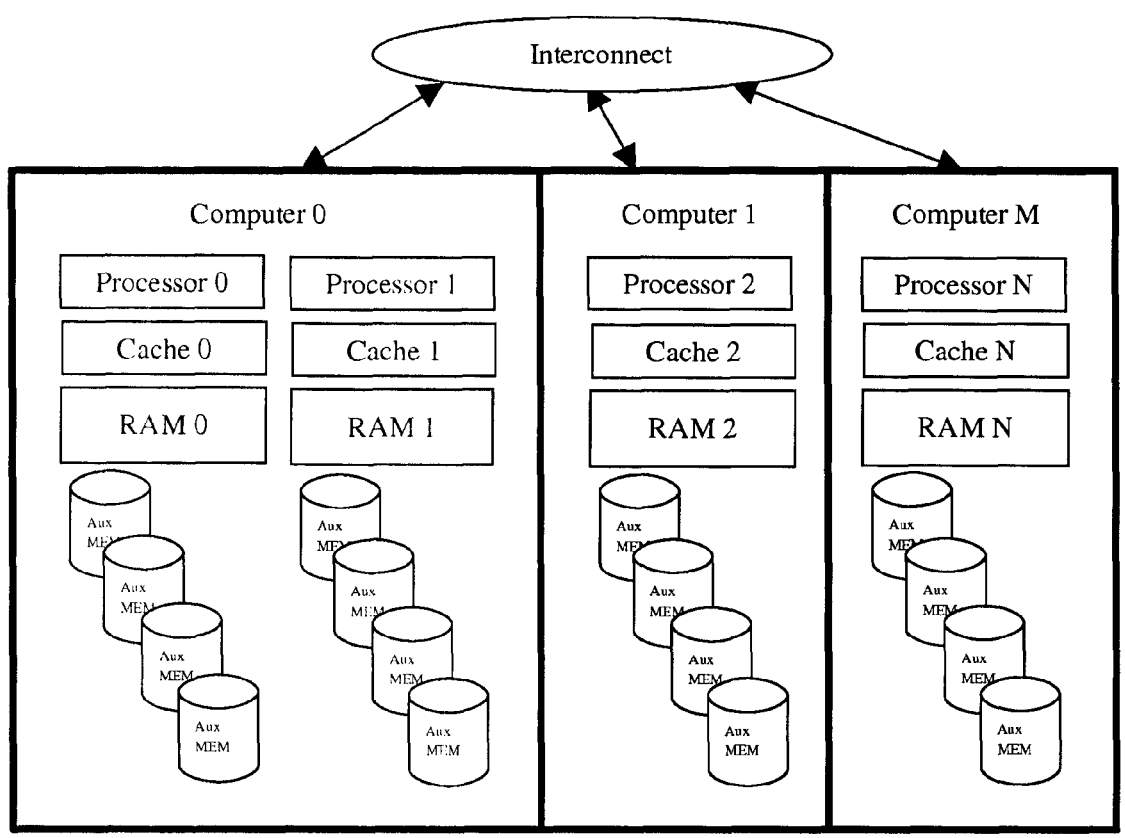
FIG. 8 illustrates an array of interconnected computer systems, containing hierarchies of storage mediums consisting of arrays of auxiliary memory, RAM, and processor caches capable of housing blocks of MDDC data.

MDDC can store these data blocks on a variety of hardware platforms but is not limited to the examples that these embodiments enumerate. MDDC can store data blocks or records on a single computer with one or more processors, one or more processor caches, RAM, and one or more auxiliary memory devices as FIG. 7 depicts. MDDC is capable of capitalizing on all available parallelism in such an environment. Examples are disk striping and symmetric multiprocessing. MDDC can distribute data blocks on multiple computers each with one or more processors, caches, RAM devices, and auxiliary memory devices as FIG. 8 depicts. MDDC can capitalize on all the advantages from environments such as massively parallel processing, grid computing, and fault tolerance configurations. All these examples and combinations of examples represent distinct embodiments of MDDC that work in combination with other embodiments.

MDDC can store the multidimensional data in compressed format to reduce the overall size of the data structure. In addition, MDDC can initialize all data blocks to be within one record of 100 percent capacity. These embodiments work in combination with all other embodiments.

In another example embodiment, MDDC clusters the multidimensional data and the database defines additional indexes on other dimensions or attributes in the multidimensional data that are not participating in the cluster. The indexes either reference primary keys for the multidimensional data or block identifiers. When the indexes use block identifiers, the database uses dynamic bit maps to combine index restrictions with MDDC restrictions since MDDC is non-dense and also uses block identifiers to address data. These embodiments work in combination with all other embodiments.

In summary, the above embodiments for the present invention describe example software implementations for many specific situations and demonstrate the wide applicability of the present invention but do not limit the present invention in any way. The claims of the present invention alone should determine its scope.

What is claimed:

1. A method for producing multidimensional data to one-dimensional data mappings and using said mappings for multidimensional data storage onto storage mediums and for multidimensional data retrieval according to query specifications from said storage mediums, said multidimensional data having one or more dimension groups, each said dimension group comprising of one or more dimensions, each said dimension comprising of one or more dimension elements, each said dimension element having a unique identifier and said multidimensional data having one or more multidimensional combinations representing one or more multidimensional data elements, each said multidimensional combination being identifiable by a combination of said unique identifiers from said dimension elements from said dimensions within said dimension groups, the query locality of said multidimensional data retrieval according to said query specifications being maintained, the symmetry of said multidimensional data retrieval according to said query specifications being maintained, and the number of said dimension elements within said dimensions within said dimension groups and the number of said multidimensional data elements within said multidimensional combinations within said multidimensional data being able to grow dynamically without limit or the need for reorganization of said dimensions, said dimension groups, or said multidimensional data the method comprising:

a. encoding each unique identifier for each said dimension element as a series of binary one and zero values;

b. encoding a third delimiter value not equal to one or zero for each said unique identifier for each said dimension element that collates separately from said binary one and zero values;

c. using said one, zero, and delimiter values to uniquely identify each said dimension element using a minimum length of said values regardless of the length of said unique identifier for any other said dimension element in associated said dimension;

d. for said multidimensional data storage, interleaving said one, zero, and delimiter values from each said unique identifier for each said dimension element associated with each said dimension and said dimension group within each said multidimensional combination to create said multidimensional data to one-dimensional data mappings and using said mappings to store said multidimensional combinations and associated said multidimensional data elements onto said storage mediums;

e. for said multidimensional data retrieval according to said query specifications, interleaving said one, zero, and delimiter values from each said unique identifier for each said dimension element associated with each said dimension and said dimension group from said query specifications to produce said multidimensional data to one-dimensional data mappings and using said mappings to locate said multidimensional combinations in said multidimensional data and retrieving said multidimensional combinations and associated said multidimensional data elements from said storage mediums.

2. The method of claim 1, wherein said binary zero and one values are uniform distributions.

3. The method of claim 2, wherein said uniform distributions are implemented by pseudo-random number generators.

4. The method of claim 1, wherein said binary zero and one values are stored in least significant bit to most significant bit order.

5. The method of claim 1, wherein said unique identifiers from said dimension elements from said dimensions within said dimension groups are uniquely identified only in the context of said unique identifiers from said dimension elements of other said dimensions in associated said dimension groups.

6. The method of claim 1, wherein said multidimensional combinations are stored in separate indexes and said multidimensional data elements are stored in separate data structures selected from the group: data store, file, table, and database object.

7. The method of claim 1, wherein said multidimensional data elements and said multidimensional combinations are stored on said storage mediums in blocks of fixed or variable size such that said blocks have a minimum packing factor that can be precisely controlled.

8. The method of claim 7, wherein said minimum packing factor completely fills said blocks to within the size of one said multidimensional data element or one said multidimensional combination.

9. The method of claim 7, wherein compression is used to further increase the capacity of said blocks.

10. The method of claim 7, wherein said blocks are distributed on one or more storage mediums selected from the group: processor cache, random access memory, solid state drive memory, and magnetic disk within the storage medium hierarchy of a computer.

11. The method of claim 10, wherein said blocks are distributed on said storage medium hierarchy of one or more computers within a group of multiple computers.

12. The method of claim 10, wherein said multidimensional data elements or said multidimensional combinations are distributed to one or more computers within a group of multiple computers and stored on said blocks in said storage medium hierarchy of each respective computer where said multidimensional data elements or said multidimensional combinations are distributed.

13. The method of claim 1, wherein a data structure that preserves order is used to organize said multidimensional data on said storage mediums.

14. The method of claim 13, wherein said data structure is selected from the group: B-tree, 2-3-tree, 2-3-4-tree, B+-tree, B#-tree, B*-tree, and UB-tree.

15. The method of claim 13, wherein said data structure is a simple ordered list.

16. The method of claim 13, wherein said data structure is selected from the group: binary tree, AVL tree, and red-black tree.

17. The method of claim 13, wherein said data structure is selected from the group: ISAM and skip sequential list.

18. The method of claim 13, wherein compression is used to reduce the index size of said data structure.

* * * * *